US011979680B2

(12) United States Patent
Gaxiola-Sosa et al.

(10) Patent No.: US 11,979,680 B2
(45) Date of Patent: *May 7, 2024

(54) SYSTEM, APPARATUS AND METHOD FOR PROVIDING REMOTE TUNER OPTIONS IN A VEHICLE ENTERTAINMENT SYSTEM

(71) Applicant: Skyworks Solutions, Inc., Irvine, CA (US)

(72) Inventors: Jesus Efrain Gaxiola-Sosa, Austin, TX (US); Aaron Blank, Austin, TX (US); Kathir Manthiram, Buda, TX (US); Shawn Davis, Cedar Park, TX (US); Jan Schnepp, Austin, TX (US); Jacob Morris, Austin, TX (US); Damian Szmulewicz, Austin, TX (US)

(73) Assignee: Skyworks Solutions, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/123,895

(22) Filed: Mar. 20, 2023

(65) Prior Publication Data
US 2023/0300288 A1    Sep. 21, 2023

Related U.S. Application Data

(60) Continuation of application No. 17/075,008, filed on Oct. 20, 2020, now Pat. No. 11,637,985, which is a (Continued)

(51) Int. Cl.
*H04N 5/455*    (2006.01)
*H04B 1/00*    (2006.01)
(Continued)

(52) U.S. Cl.
CPC .......... *H04N 5/455* (2013.01); *H04B 1/0003* (2013.01); *H04B 1/406* (2013.01); *H04B 7/2637* (2013.01);
(Continued)

(58) Field of Classification Search
CPC ......... H04N 7/17318; H04N 21/41407; H04N 21/43615; H04N 21/47202;
(Continued)

(56) References Cited

U.S. PATENT DOCUMENTS 5,832,024 A    11/1998    Schotz et al.
7,990,480 B2    8/2011    Naito
(Continued)

FOREIGN PATENT DOCUMENTS

WO    WO 2009/035273    3/2009

OTHER PUBLICATIONS

Hirshmann, "New product: Hirschmann Mobility Remote Tuner Module", Sep. 4, 2018, 4 pages.
(Continued)

*Primary Examiner* — Ajibola A Akinyemi
(74) *Attorney, Agent, or Firm* — Knobbe, Martens, Olson & Bear, LLP (57) ABSTRACT

In one example, a remote tuner module includes: a first tuner to receive, process and demodulate a first radio frequency (RF) signal to output an analog audio signal, and to receive and process a second RF signal to output a first downconverted modulated signal; a second tuner to receive and process the second RF signal to output a second downconverted modulated signal; a demodulator circuit coupled to the first and second tuners to demodulate and link the first and second modulated signals, to output a linked demodulated signal. The remote tuner module may further include a gateway circuit coupled to at least the demodulator circuit to output the analog audio signal and the linked demodulated signal.

19 Claims, 5 Drawing Sheets

Related U.S. Application Data division of application No. 16/567,386, filed on Sep. 11, 2019, now Pat. No. 10,834,356.

(51) Int. Cl.

| | | |
|---|---|---|
| *H04B 1/403* | (2015.01) | |
| *H04B 7/26* | (2006.01) | |
| *H04N 5/46* | (2006.01) | |
| *H04N 5/50* | (2006.01) | |
| *H04N 21/426* | (2011.01) | |

(52) U.S. Cl.
CPC .................. *H04N 5/46* (2013.01); *H04N 5/50* (2013.01); *H04N 21/4263* (2013.01)

(58) Field of Classification Search
CPC ....... H04N 21/43637; H04N 21/25825; H04N 21/41265; H04N 21/4312; H04N 21/4821; H04N 21/4622; H04N 21/4668; H04N 21/4755; H04N 21/482; H04N 21/8173; H04N 21/47; H04N 21/2665; H04N 21/4113; H04N 21/4782; H04N 21/4316; H04N 21/4532; H04N 21/234363; H04N 21/2358; H04N 21/4143; H04N 21/422; H04N 21/42204; H04N 21/4358; H04N 21/440263; H04N 21/4438; H04N 21/47208; H04N 21/478
USPC ........................................................ 348/726
See application file for complete search history.

(56) References Cited

U.S. PATENT DOCUMENTS

| | | | |
|---|---|---|---|
| 9,088,341 B2 | 7/2015 | Hu et al. | |
| 10,284,277 B2 | 5/2019 | Waight et al. | |
| 10,834,356 B1 | 11/2020 | Gaxiola-Sosa et al. | |
| 11,050,450 B2 | 6/2021 | Davis et al. | |
| 11,637,985 B2 | 4/2023 | Gaxiola-Sosa et al. | |
| 2003/0060219 A1 | 3/2003 | Parsiokas | |
| 2005/0122428 A1 | 6/2005 | Kawakami | |
| 2007/0142011 A1* | 6/2007 | Shatara ................. | H04B 7/0802 455/222 |
| 2008/0119150 A1* | 5/2008 | Su .......................... | H04B 7/0814 455/193.1 |
| 2008/0120676 A1* | 5/2008 | Morad ............. | H04N 21/42607 375/E7.076 |
| 2012/0042157 A1 | 2/2012 | Leclercq | |
| 2012/0172087 A1 | 7/2012 | Varela et al. | |
| 2019/0339355 A1 | 11/2019 | Nosthoff et al. | |

OTHER PUBLICATIONS

Maxim Integrated, "Design solutions, automotive, remote tuner architecture reduces wiring weight and cost while improving noise immunity", Date unknown, 3 pages.

Silicon Labs, "Si47942 Data Short", Preliminary Rev. 0.1, 5 pges, at least as early as Jun. 2018.

Silicon Labs, "Si47951-52 Data Short", Preliminary Rev. 0.1, 5 pages, at least as early as Jun. 2018.

Silicon Labs, "Si4692 Data Short", Preliminary Rev. 0.1, 5 pages, at least as early as Jun. 2018.

Silicon Labs, "Silicon labs' radio tuner lcs drive software-defined radio solution for Renesas's "R-Car" SoC In-Vehicle Infotainment Systme", 3 pages, Oct. 31, 2017 (https://new.silabs.com/news-briefs?item+16).

U.S. Appl. No. 16/028,517, filed Jul. 6, 2018, entitled "System, Apparatus and Method for Hardware and Software Support of Radio Functionality", by Shawn Michael Davis, et al.

\* cited by examiner

SYSTEM, APPARATUS AND METHOD FOR PROVIDING REMOTE TUNER OPTIONS IN A VEHICLE ENTERTAINMENT SYSTEM

This is a continuation of U.S. patent application Ser. No. 17/075,008, filed Oct. 20, 2020, which is a divisional of U.S. patent application Ser. No. 16/567,386, filed Sep. 11, 2019, the content of which is hereby incorporated by reference.

BACKGROUND

Radios are incorporated into ever more types of end user products. And over time, radios have transitioned from primarily analog circuitry to mixes of analog and digital circuitry. In addition, while many radios are implemented fully in hardware, some radios are implemented by way of software, as a so-called software-defined radio (SDR).

One common implementation of a radio is within an automotive environment. In many new automobiles, highly immersive entertainment options are becoming more readily available. Oftentimes these entertainment options are included in a head unit, typically located around the dashboard of the vehicle. This is so, as the dashboard is often implemented with one or more displays that provide a user interface for the user to interact, at least in part, with the entertainment system. While this works well for enabling ready interaction with the user, the head unit and the display, since one or more antennas may be located at remote portions of the vehicle, such as in connection with a rear window, rear quarter panels or so forth, significant wiring costs are incurred. Such wiring also entails use of expensive and heavy coaxial or other cables capable of communicating radio frequency (RF) signals. In addition, given the distance between the antenna and head unit, oftentimes one or more amplifiers such as low noise amplifiers (LNAs) are included in the path. While adapting at least some portions of the radio remotely from the head unit is being considered, current options are limited and inflexible.

SUMMARY OF THE INVENTION

In one aspect, a system includes a remote tuner module and a head unit coupled to the remote tuner module via a link. The remote tuner module may include: a first tuner to receive, process and demodulate a first radio frequency (RF) signal to output an analog audio signal, and to receive and process a second RF signal to output a first downconverted modulated signal; a second tuner to receive and process the second RF signal to output a second downconverted modulated signal; a demodulator circuit coupled to the first tuner and the second tuner (where this demodulator circuit includes: a first demodulator circuit to demodulate the first downconverted modulated signal to a first demodulated signal; a second demodulator circuit to demodulate the second downconverted modulated signal to a second demodulated signal; and a linker circuit to link the first demodulated signal and the second demodulated signal and to output the linked demodulated signal). The remote tuner module may further include a first gateway circuit coupled to at least the demodulator circuit to output the analog audio signal and the linked demodulated signal.

In turn, the head unit may include: a second gateway circuit to receive and output the analog audio signal and the linked demodulated signal; a system on chip (SoC) coupled to the second gateway circuit to receive and process the analog audio signal and the linked demodulated signal; and an audio processor to output an audio signal from one or more of the analog audio signal and the linked demodulated signal.

In an example, the link comprises a serial data bus, and the first gateway circuit and the second gateway circuit comprise serializer/deserializer circuits. The head unit may communicate control information to the remote tuner module via the serial data bus. The first demodulator circuit may demodulate another downconverted modulated signal received from the first tuner to a third demodulated signal.

In a first mode, the demodulator circuit is to seamlessly link the first demodulated signal and the second demodulated signal and to output the seamlessly linked demodulated signal to the first gateway circuit. And in a second mode, a bypass circuit is to provide the first downconverted modulated signal and the second downconverted modulated signal to the first gateway circuit and bypass the demodulator circuit, to cause the first gateway circuit to send the first downconverted modulated signal and the second downconverted modulated signal to the head unit.

The remote tuner module may have a circuit board on which the first tuner and the second tuner are adapted, where the circuit board comprises: a layout portion to which the demodulator circuit may be adapted; and a shunt element adapted on the circuit board to direct the first downconverted modulated signal and the second downconverted modulated signal to the first gateway circuit when the system does not include the demodulator circuit.

In an example, the system may further include a second remote tuner module comprising a third tuner and a fourth tuner. The second remote tuner module is coupled to the remote tuner module, and the first gateway circuit is to further output at least one of one or more additional analog audio signals and one or more demodulated signals from the second remote tuner module. The second remote tuner module may be coupled to one or more antennas via a radio frequency cable, and is coupled to the remote tuner module via a serial digital bus. The link may comprise a wireless link, and the first gateway circuit and the second gateway circuit comprise wireless interface circuits.

In another aspect, a system includes a remote tuner module and a head unit coupled to the remote tuner module via a link. The remote tuner module may include: a first tuner to receive, process and demodulate a first RF signal to output an analog audio signal; a second tuner to receive and process a second RF signal to output a second downconverted modulated signal; and a first gateway circuit coupled to the first tuner and the second tuner to output the analog audio signal and the second downconverted modulated signal. The head unit may include: a second gateway circuit to receive and output the analog audio signal and the second downconverted modulated signal; a SoC coupled to the second gateway circuit to demodulate the second downconverted modulated signal when the system does not include a hardware demodulator circuit, process the second downconverted demodulated signal and output a second audio signal; and an audio processor to output an audio signal from one or more of the analog audio signal and the second audio signal.

In an example, the first tuner may further receive and process the second RF signal to output a first downconverted modulated signal, and the first gateway circuit is to output the first downconverted modulated signal. The first downconverted modulated signal may be a digital I/Q data stream. The SoC may demodulate the first downconverted modulated signal to a first downconverted demodulated signal, and link the first downconverted demodulated signal and the second downconverted demodulated signal and output the linked downconverted demodulated signal.

In an example, the remote tuner module may comprise a circuit board on which the first tuner and the second tuner are adapted, where the circuit board comprises: a layout portion to which a hardware demodulator circuit may be adapted; and a shunt element adapted on the circuit board to direct the second downconverted modulated signal to the first gateway circuit when the system does not include the hardware demodulator circuit. When the system includes the hardware demodulator circuit, the first gateway circuit is to output a seamlessly linked downconverted demodulated signal, and the SoC is not to receive and demodulate the second downconverted modulated signal.

In an example, the system further includes a second remote tuner module comprising a third tuner and a fourth tuner. where the second remote tuner module is coupled to the remote tuner module, and the first gateway circuit is to further output at least one of one more additional analog audio signals and one or more digital I/Q data streams from the second remote tuner module.

In another aspect, a method comprises: receiving, in a processor of a head unit of a vehicle entertainment system, a user selection of a requested radio band and channel; sending control information to a remote tuner module coupled to the head unit to cause the remote tuner module to output one or more digital I/Q data streams representing one or more RF signals and further to output an analog audio stream representing another RF signal; receiving the one or more digital I/Q data streams and the analog audio stream in the processor from the remote tuner module, via a link that couples the remote tuner module and the head unit; demodulating the one or more digital I/Q data streams in the processor into a demodulated audio stream, via execution of a software defined demodulator; and outputting at least one of the analog audio stream and the demodulated audio stream to an audio processor of the head unit.

In an example, the method further comprises sending the control information to the remote tuner module via the link, the link comprising a digital bus. In addition, two of the one or more digital I/Q data streams may be linked in the processor, via the execution of the software defined demodulator. In addition, the analog audio stream and the demodulated audio stream may be blended in the processor.

DETAILED DESCRIPTION

In various embodiments, at least portions of radio functionality for an entertainment system such as a vehicle infotainment system, radio head unit or so forth, may be separated into different modules to be located in different portions of a vehicle. For example as described herein, one or more remote tuner modules (RTMs) may include at least tuner functionality and may be located in close proximity to one or more antennas adapted within the vehicle, to reduce routing of RF signals, potentially reducing the need for one or more amplifiers. In turn the one or more RTMs may couple to a head unit, e.g., located in close relation to a vehicle dashboard, by way of a wired or wireless communication link, which may be implemented without the need of carrying RF signals from each antenna to the head unit, reducing cost, weight, and so forth.

And with embodiments, a flexible distribution of radio functionality processing may be adapted, both statically and/or dynamically, to enable at least certain operations to be flexibly provided by way of software, hardware or combinations of hardware and software. Embodiments are applicable to many different types of systems for use in homes, businesses or other establishments or for mobile use.

For purposes of illustration, representative embodiments are discussed in the context of vehicle-located systems. Such systems may take the form of original equipment manufacturer (OEM) entertainment systems, either provided by a vehicle manufacturer or an OEM supplier to the vehicle manufacturer. In other cases, such systems may take the form of after-market systems that a consumer may purchase and install into a vehicle. While such vehicle systems are described for exemplary purposes and may desirably leverage the flexibility of design options afforded by embodiments herein, of course the techniques for implementing separated radio processing by way of location separation and hardware and/or software-based radio functionality are applicable to other system types.

In embodiments at least certain radio functionality such as demodulation functionality can be designed into the system in a manner to enable, in system operation, only a single one of the hardware or software implementation of the demodulator functionality. Or in other embodiments, the system design may accommodate dynamic runtime selection of hardware or software demodulation functionality.

Note that in the art the term "software defined radio" is typically used to refer to a complete radio, other than RF and downconversion circuitry that is implemented by way of software. Instead that term and the additional term "software defined demodulator" are used herein to refer to particular and limited portions of radio functionality that are implemented by way of software. Understand that this software, in whatever form it is provided, is executed on some type of hardware, typically a programmable hardware element such as a general-purpose processor or so forth.

A single printed circuit board for RTMs may be designed that includes physical layout locations for front end radio circuitry (such as one or more tuners implemented as standalone ICs), and for demodulator circuitry (such as implemented by way of one or more standalone hardware demodulator ICs). In addition, the single printed circuit board may further include physical layout locations for additional functionality, including one or more gateway circuits, which in different use cases can be implemented by way of a wired or wireless circuit. In turn, a single printed circuit board may be designed for the head unit that includes physical layout locations for various circuitry, including a corresponding gateway circuit to interface with the gateway circuit of the one or more RTMs, a general-purpose processor such as a system on chip (SoC), digital signal processor (DSP) or so forth, and additional components for additional functionality of the system, such as a navigation system, display system, communication system, network system and so forth. Note that in some cases, a system designer may design these printed circuit boards to be used for many different actual entertainment system implementations. For example, the printed circuit boards may be used for options ranging from basic low-end radio systems to high-end fully-featured entertainment systems.

As such, in certain cases these printed circuit boards may include a layout that provides locations for multiple hardware components (e.g., ICs, connectors and so forth). For some systems, certain components for use in a more fully featured system may not be included in a bill of materials for a more basic system. And in addition, it is equally possible that for other components such as general-purpose processor, tuner or so forth, different tiers of entertainment systems may use different, but typically pin-compatible, components. As such, for a more basic system, more basic cheaper less performant tuners, processors or so forth are present. Instead for a more advanced or fully featured system, higher quality, more fully featured components are present. As to the flexible provision of demodulator functionality, understand that while a single circuit board design layout for an RTM may include a location on the board for a demodulator IC, a particular system offering may or may not include the demodulator IC, based on design choices. That is, for purposes of reducing a total bill of materials (BOM), a separate demodulator IC may not be provided and demodulator functionality instead can be implemented within code that executes on a general-purpose processor of, e.g., the head unit.

Different manners of flexibly using a single circuit board design for RTM versions both having and not having a standalone demodulator IC are possible. In one embodiment, during manufacture, should a particular circuit board not be populated with a demodulator IC, a zero ohm resistor or other shunt mechanism, or interconnection member may be provided to directly couple a tuner output to an output path of the RTM. Instead, when a demodulator IC is populated onto the RTM circuit board no such component is provided, and interconnect circuitry of the RTM circuit board design (e.g., interconnects formed on one or more layers of the circuit board) is configured to provide a first path from tuner to demodulator IC and a second path from demodulator IC to the output path of the RTM. Of course, in other embodiments, instead of providing flexible implementation capabilities by way of a single printed circuit board, different circuit board designs may be provided that are dedicated to provide appropriate layout portions and interconnect circuitry for an RTM that includes a demodulator IC and a different circuit board for an RTM when it does not include such demodulator IC.

Figure 1A:
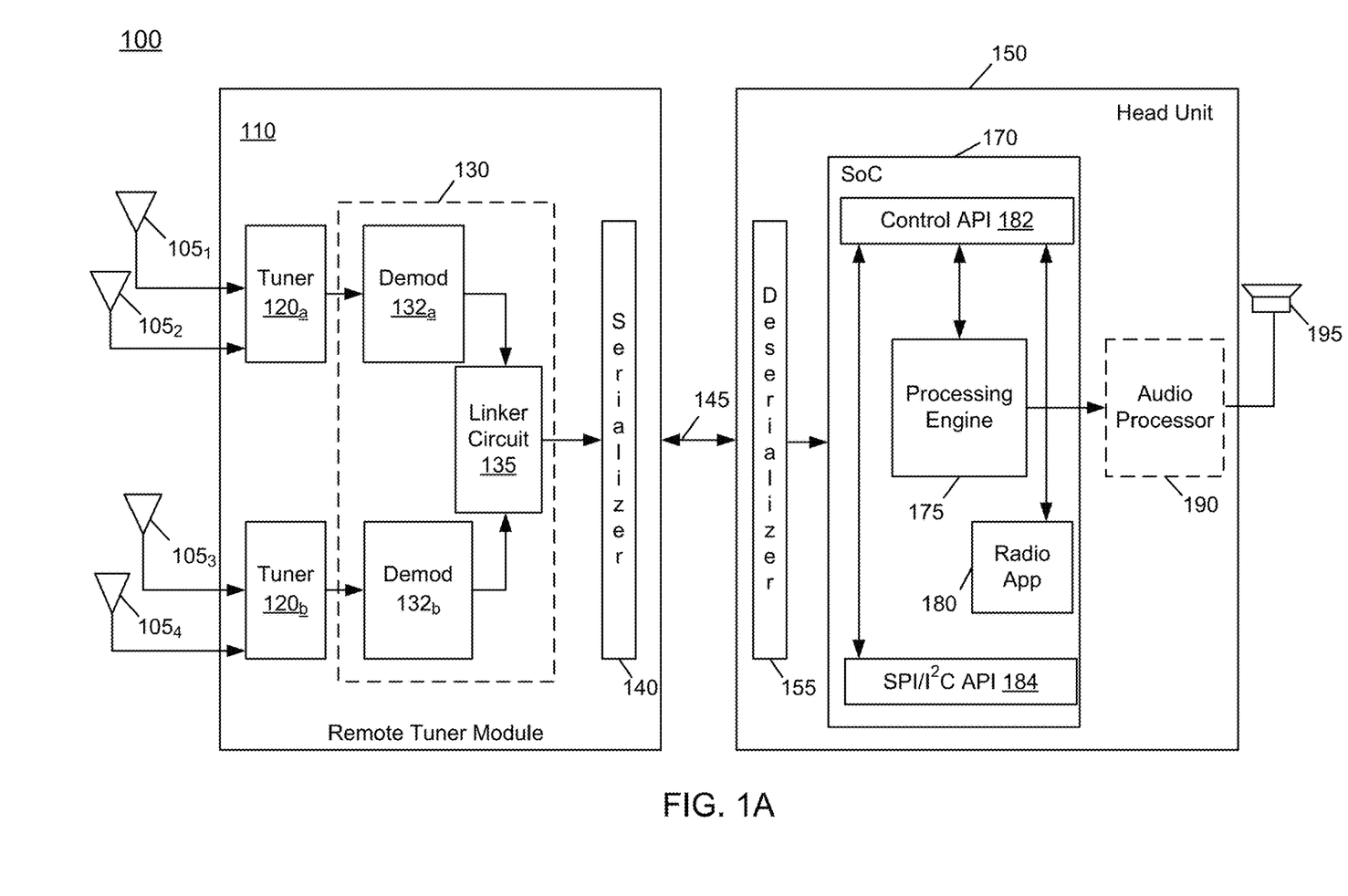
FIG. 1A is a block diagram of a system in accordance with an embodiment.

Referring now to FIG. 1A, shown is a block diagram of a system in accordance with an embodiment. As shown in FIG. 1A, system 100 is at least a portion of a vehicle infotainment system. As illustrated, system 100 includes at least one remote tuner module (RTM 110). RTM 110 may be implemented with at least one circuit board and may be affixed in a given location of a vehicle, such as a rear portion of the vehicle, relatively close to one or more antennas which couple to RTM 110. More specifically as shown in FIG. 1A, a plurality of antennas 105₁-105₄ couple to RTM 110. In this way, reduced RF cabling is needed, as well as potentially avoiding the need for one or more low noise amplifiers to amplify RF signals for transmission to RTM 110.

RTM 110 may be located remotely from a radio head unit 150 of the vehicle. As illustrated, RTM 110 includes multiple tuners 120$_{a,b}$ that may be adapted on a circuit board, along with additional components. In different implementations, such components can be adapted on the circuit board via typical connection mechanisms, including surface mount connections, ball grid connections or through hole connections, among others. In the embodiment of FIG. 1A, RTM 110 may be implemented as a full radio RTM, providing analog/digital audio outputs. In addition RTM 110 may output selected data such as traffic information, control information and so forth.

Understand while four antennas are shown for purposes of discussion, in different implementations a vehicle may be adapted with only a single antenna or more or fewer than four antennas, as appropriate for a given tier of radio solution, as well as desired bands of service. For purposes of discussion herein, assume that antennas 105 are configured to receive digital radio communications in accordance with one or more digital radio standards such as digital audio broadcasting (DAB), HD radio, digital radio mondiale (DRM), China Digital Radio (CDR), or so forth, analog radio stations (e.g., AM and FM) and potentially other broadcast signaling, including video signaling, e.g., according to a digital media broadcast (DMB) standard.

In the illustration of FIG. 1A, tuners 120$_{a,b}$ each may be a multi-tuner multi-band tuner to receive and process RF signals of different bands. In general, tuners 120 may include RF front end circuitry such as a LNA and other gain control circuitry, mixer, filter, digitizer and so forth that operate to receive and process the RF signal and generate a resulting digitized signal at a downconverted frequency. For example, tuners 120 may be configured to output signals at baseband, zero intermediate frequency (ZIF) or other downconverted level. In embodiments, tuners 120 may output such signals in digitized form.

In addition, one or more of tuners 120 may be configured to receive and process analog radio signals, e.g., AM and FM signals. In such embodiments, tuners 120 further may be configured with complete radio receiver circuitry to demodulate these AM and FM signals into demodulated audio signals, and to generate audio output signals, e.g., according to a given digital format such as an Inter-IC Sound (I2S) format. While not shown for ease of illustration in FIG. 1A, at least tuner 120$_a$ may output an audio signal as an audio stream that is provided to additional circuitry of RTM 110, described further below.

In different implementations, tuners 120$_{a,b}$ may be configured to receive, process and demodulate AM and FM and possibly also weather band signals. In addition, tuners 120 may be configured to receive and process additional RF signals into downconverted digital streams, including digital streams for HD radio, DAB radio and so forth, e.g., in the form of digital I/Q data. Depending upon the particular configuration, tuners 120 thus may be adapted to output one or more audio streams as well as one or more digital I/Q data streams for one or more radio standards.

As further illustrated in FIG. 1A, for digital formats, resulting digitized signals are provided to a demodulator 130. And as described further below, one or more audio streams output from tuners 120 may be provided to demodulator 130. In embodiments, demodulator 130 may be implemented as a standalone IC adapted in a particular layout portion of the circuit board of RTM 110. Note that as shown in FIG. 1A, demodulator 130 is illustrated in dashed form. This is so, since for a particular implementation of infotainment system 100, the demodulator IC may not be present. In any case, as illustrated in FIG. 1A, demodulator 130 includes multiple demodulation circuits 132$_a$, 132$_b$ (generically demodulator circuit 132), each to receive incoming signal information from one of tuners 120$_a$, 120$_b$. In turn, demodulator circuits 132 operate to demodulate the incoming signals, which are received in a modulated form. In general, demodulator circuits 132 may include various circuitry including asynchronous sample rate converters, decoder circuitry and so forth. Demodulator circuits 132 output demodulated signals, which are provided to a linker circuit 135.

In embodiments, linker circuit 135 may seamlessly link demodulated signals of the two paths when appropriate. For example, for DAB radio communication, a given radio station may transmit at multiple frequencies, possibly including an FM channel and one or more DAB channels carrying the same audio content. As a vehicle drives along a route, it may first tune to the radio station at a first frequency (e.g., as received and processed within tuner $120_a$ and demodulator circuit $132_a$). However, as the vehicle continues along its route assume that this signal becomes degraded. As a result, better signal quality may be realized via signals received at another frequency via tuner $120_b$ and demodulator circuit $132_b$. As such, linker circuit 135 may seamlessly transition its output to be directed from a given one of demodulator circuits 132 to the other in a seamless fashion (e.g., by providing buffering resources or so forth) such that the transition from one frequency to another occurs seamlessly to a listener. Note that in some cases, linker circuit 135 may transition output from one to the other in a less than completely seamless manner. In other use cases, such as where tuners 120 are handling independent channels (such as for background, data or so forth), linker circuit 135 may operate in a routing or pass through mode in which demodulated information from both of tuners 120 can be output, without performing any linking.

In still further use cases, such as for HD radio, linker circuit 135 may in this routing or pass through mode pass through an HD radio signal that itself may be a blend of an HD radio stream and an analog audio stream. To this end, the audio stream output from tuner 120 may be provided directly to a corresponding demodulator circuit 132 for use in blending. Or in other cases, demodulated analog audio output from tuner 120 may first be provided to linker circuit 135 and then routed back to demodulator circuit 132 for blending. Note that in cases blending between analog audio and a primary service (MPS) may occur seamlessly where an automatic level and time alignment technique is used, which may be performed in a corresponding demodulator circuit 132. In other cases, a switch between analog audio and a primary service may occur without blending, such as based on signal metrics.

Still with reference to FIG. 1A, demodulated signals output from demodulator 130 are provided to a gateway circuit, implemented in FIG. 1A as a serializer 140 that is configured to receive the demodulated signals and convert them into a serial format for communication to head unit 150. In various embodiments, head unit 150 may be implemented within a different portion of the vehicle, e.g., closely located to an entertainment system in a dashboard of the vehicle. Serializer 140 thus may receive digitally demodulated signals from demodulator 130 along with analog demodulated audio from one or more of tuners 120, depending on mode of operation. Serializer 140 may convert these streams into appropriate serial format for communication across a digital bus 145 to head unit 150, e.g., according to an I2S format or any other particular or proprietary standard. Note that while component 140 is described as a serializer for purposes of serializing outgoing serial streams to head unit 150, the component is implemented as a serializer/deserializer, such that it may deserialize incoming (e.g., control) information received via digital bus 145 in the direction from head unit 150 to RTM 110.

As further shown in FIG. 1A, RTM 110 couples to head unit 150 via digital bus 145, which may be implemented as a serial digital bus to communicate analog and digitally demodulated audio and control information. In embodiments, digital bus 145 may be implemented as a bidirectional bus to enable communication of control information from head unit 150 to RTM 110 and further to enable communication of status information in one or both directions, along with the communication of data information from RTM 110 to head unit 150. In an embodiment, digital bus 145 may be implemented with a shielded twisted pair cable. This or another digital cable may be cheaper and lighter weight than corresponding RF cabling that would otherwise be necessary. In addition, such cabling provides cross-talk immunity, and simplifies wiring harnesses and installation. And in embodiments in which multiple RTMs are present, a single shielded twisted pair cable may provide communication between these multiple RTMs and head unit 150, in contrast to inclusion of multiple RF cables, one for each communication path between antenna/LNA combinations (in the absence of an RTM) and head unit 150.

Still with reference to FIG. 1A, head unit 150 includes various components, which may include one or more integrated circuits adapted on a separate circuit board (in comparison to the circuit board of RTM 110). Of course in other embodiments, all components shown in FIG. 1A (other than antennas and output devices) may be implemented in a single module. However to leverage reduced cabling costs and so forth, a segmentation of components between at least one remote tuner module and a separate head unit may be typical in implementation.

As shown in FIG. 1A, head unit 150 includes a gateway circuit implemented as a deserializer 155 to receive the incoming information from digital bus 145 and deserialize it. Note that while component 155 is described as a deserializer for purposes of deserializing incoming serial streams from RTM 110, the component is a serializer/deserializer, such that it may serialize outgoing information sent via digital bus 145 in the direction from head unit 150 to RTM 110.

As seen, deserializer 155 couples to a system on chip (SoC) 170, which is a main processor of infotainment system 100. As illustrated in FIG. 1A, SoC 170 includes a processing engine 175. Although a single processing engine is shown for ease of illustration, understand that in various implementations, multiple processing engines may be provided. As examples, processing engine 175 may be implemented as one or more general-purpose processor cores, one or more DSPs, and/or one or more other programmable logic circuits.

SoC 170 is additionally shown to include a radio application 180, which in an embodiment may be a high level radio application of the system. Radio application 180 may act as an interface to receive user input (e.g., a request for a given radio station) and provide instructions to additional components to effect the requested functionality. To this end, SoC 170 is further shown to include a control application programming interface (API) 182 that acts as a top level of a software stack for the radio functionality. Control API 182 may be configured to communicate with radio application 180 and in turn abstract underlying layers of the radio software stack and the radio hardware. Control API 182 and lower layers of the radio software stack may, in a manner transparent or invisible to radio application 180, handle certain radio functionality such as demodulation functionality in hardware or software depending upon a particular system implementation. That is, while in the embodiment of FIG. 1A, audio information is received from RTM 110, is further possible that digital I/Q information instead is received and demodulation operations may be performed within SoC 170, as described further below in another embodiment.

To enable communication with underlying radio hardware (such as demodulator 130 and tuners 120), SoC 170 may further include a serial peripheral interface (SPI) or Inter-Integrated Circuit ($I^2C$) API 184 that acts as a physical interface between a software stack and additional hardware of system 100. Note that while radio application 180, control API 182 and SPI/$I^2C$ API 184 are illustrated as separate components within SoC 170, each of these components in fact may be implemented as software and/or firmware that executes on processing engine 175 or other programmable circuitry within SoC 170. As such, whether implemented as software or firmware, these components may include instructions that are stored in a non-transitory storage medium. Such storage medium may be implemented within SoC 170 itself such as an internal non-volatile memory or an external memory such as an external flash memory of system 100.

As further shown in FIG. 1A, processing engine 175 outputs audio signals which may be provided to an optional audio processor 190. Audio processor 190 may perform additional audio processing such as post-processing, balance control, fading, mixing, filtering, equalization, and so forth. In turn, audio processor 190 outputs audio signals to one or more speakers 195.

Understand while shown at this high level in the embodiment of FIG. 1A, many variations and alternatives are possible. For example, RTM 100 may provide additional audio signals coming from non-terrestrial automotive radio broadcasts, such as satellite radio or any other auxiliary audio signal from a different origin, and which may be sent from RTM 110 to head unit 150. Also, while FIG. 1A illustrates a multi-tuner embodiment, in more basic implementations a single tuner may be provided within a given RTM. Still further, while not shown in FIG. 1A, it is further possible for demodulated audio (e.g., I2S audio) to be provided directly from tuner 120 to serializer 140.

Figure 1B:
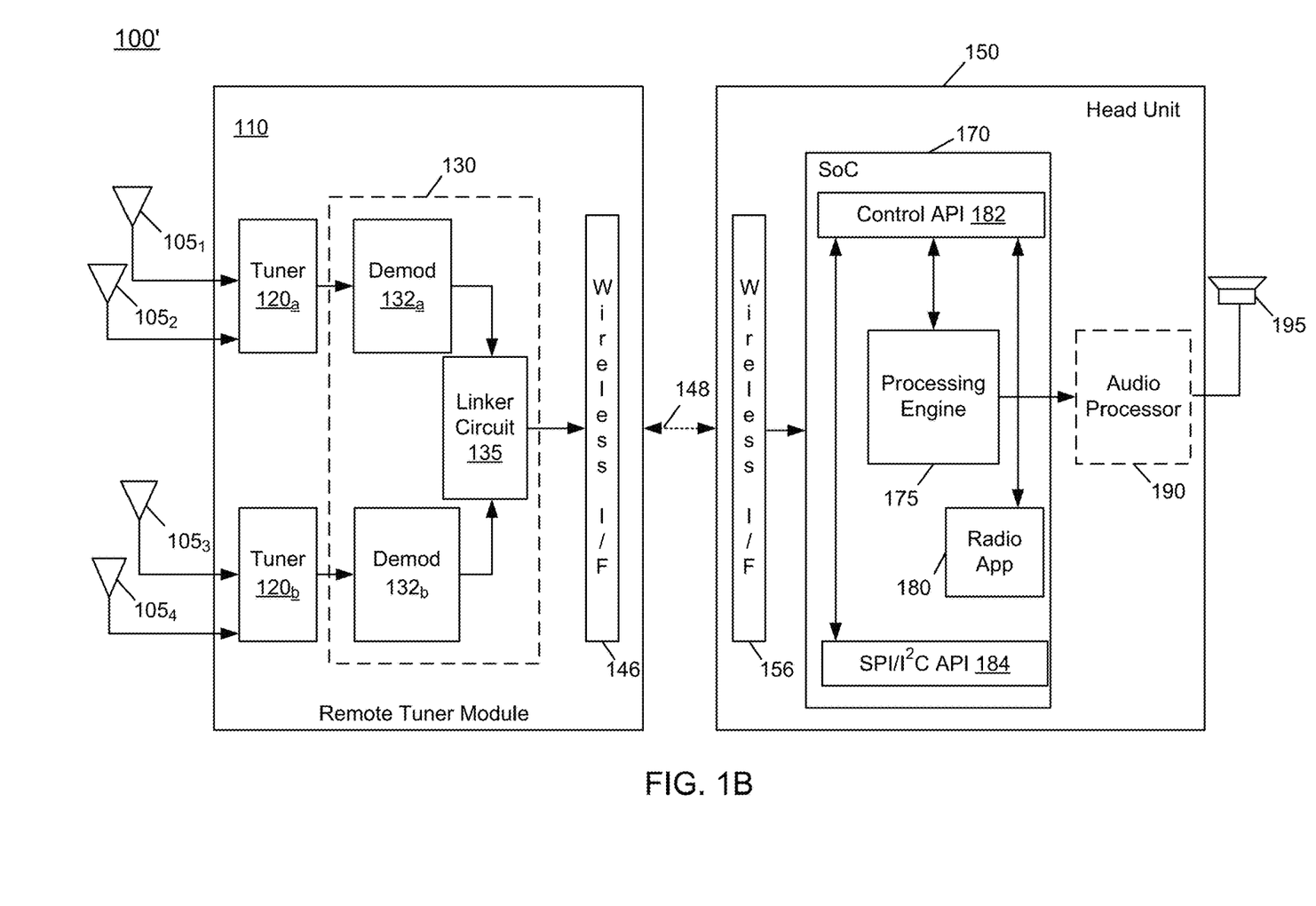
FIG. 1B is a block diagram of a system in accordance with another embodiment.

In other embodiments, to completely remove wiring between remote tuner module and head unit, it is possible for wireless communication to occur between an RTM and the head unit. Referring now to FIG. 1B, shown is a block diagram of a system in accordance with another embodiment. As shown in FIG. 1B, system 100' may be adapted substantially the same as system 100 of FIG. 1A. However, in this embodiment, the gateway circuit is implemented using a wireless interface 146 in RTM 110 and a corresponding wireless interface 156 in head unit 150, such that wireless communication may occur between RTM 110 and head unit 150 via a wireless link 148. In various embodiments, communication via wireless link 148 may take different forms, including an IEEE 802.11 or 802.15 wireless communication protocol such as a Bluetooth communication protocol, or one or a variety of different proprietary wireless communication protocols. To this end, wireless interfaces 146, 156 may be implemented as multi-protocol wireless interfaces, such that depending upon a given vehicle into which a system is designed, one of multiple wireless communication protocols may be used. And it is further possible that based on additional wireless communications occurring in the vehicle environment, one of these multiple protocols may be selected, to avoid interference. Further, while not shown in FIG. 1B, understand that it is also possible to provide gateway circuits that provide for both wired and wireless communication, such that depending upon operating conditions within a given vehicle, a selected one of a wired or wireless path may be used to provide communication between one or more RTMs and a head unit.

Figure 2A:
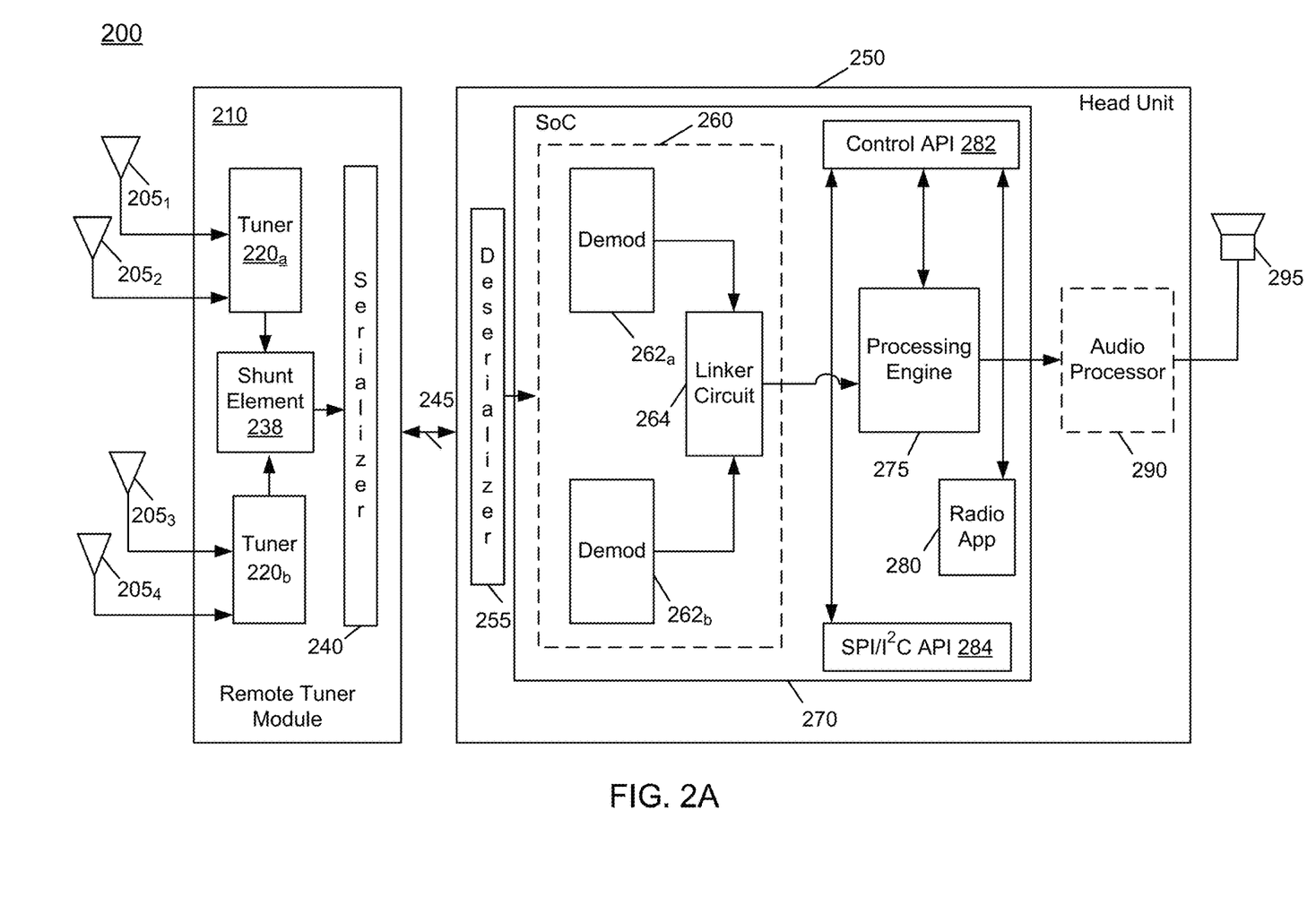
FIG. 2A is a block diagram of a system in accordance with another embodiment.

In another implementation, a system designer may choose to not incorporate a hardware demodulator, either in an RTM or within a head unit. Instead in some implementations, demodulation operations may be performed using software. Referring now to FIG. 2A, shown is a block diagram of a system in accordance with another embodiment. As illustrated in FIG. 2A, a RTM 210 is present as part of a vehicle infotainment system 200. Note that system 200 may be a different version of a vehicle infotainment system than system 100. For example, system 200 may include different components, additional (or less) functionality or so forth. However, in the implementation of FIG. 2A, a hardware demodulator is not present in RTM 210. Instead demodulator functionality may be incorporated within a head unit 250, e.g., within an SoC 270, by way of provision of code to perform the demodulation functionality. As such RTM 210 is an RTM for SDR, providing analog audio and digital I/Q data.

While RTM 210 lacks demodulator functionality, in other aspects it may be similarly configured as RTM 110 of FIG. 1A, in that it includes multiple tuners $220_{a,b}$ configured to receive incoming RF signals from each of multiple antennas and to process and output information, e.g., as demodulated analog audio or digitally modulated information, e.g., digital IQs of one or more radio formats. As such, the outputs of each tuner 220 is coupled to a serializer 240, which may serialize received signal information into a serial bitstream for communication to head unit 250, via a serial digital bus 245 which, in an embodiment may be a bidirectional high-speed serial bus, e.g., implemented using a shielded twisted pair cable.

Nonetheless, a circuit board of RTM 210 may have the same design as a circuit board of RTM 110 of FIG. 1A. As such, a single circuit board can be designed, and depending upon design choices for a particular implementation, hardware radio functionality such as demodulator functionality can be implemented in hardware or software. To this end, a shunt mechanism or element 238 may be used to provide routing from the different outputs of tuners 220 directly to serializer 240. Note that shunt element 238 in an embodiment may be implemented as a zero ohm resistor that couples between the output of tuners 220 and an input to serializer 240. In some cases another type of interconnection member such as controllable switches may be used to provide this direct interconnection path where the switches are set in a first configuration when a hardware demodulator (e.g., demodulator 130 of FIG. 1A) is present and set in a second configuration when a hardware demodulator is not present (as in FIG. 2A). Of course in other embodiments dedicated circuit board designs may be provided for RTMs incorporating a hardware demodulation circuit and RTMs not incorporating such circuit.

As further illustrated in FIG. 2A, SoC 270 includes a software defined demodulator 260. In the embodiment shown, SDR demodulator 262 includes multiple demodulator components $262_a$, $262_b$ and a linker circuit 264. In embodiments, SDR demodulator 262 and its constituent components may be implemented in software that is stored in a non-transitory storage medium. Further understand that in operation, SDR demodulator 262 may execute on processing engine 275 or another programmable processing circuit, such as a processor core, DSP, microcontroller of so forth. In other aspects, head unit 250 may be similarly configured as in FIG. 1, including a radio application 280, control API 282, and SPI/I²C API 284. In addition, system 200 may include an audio processor 290 and an output device 295.

Figure 2B:
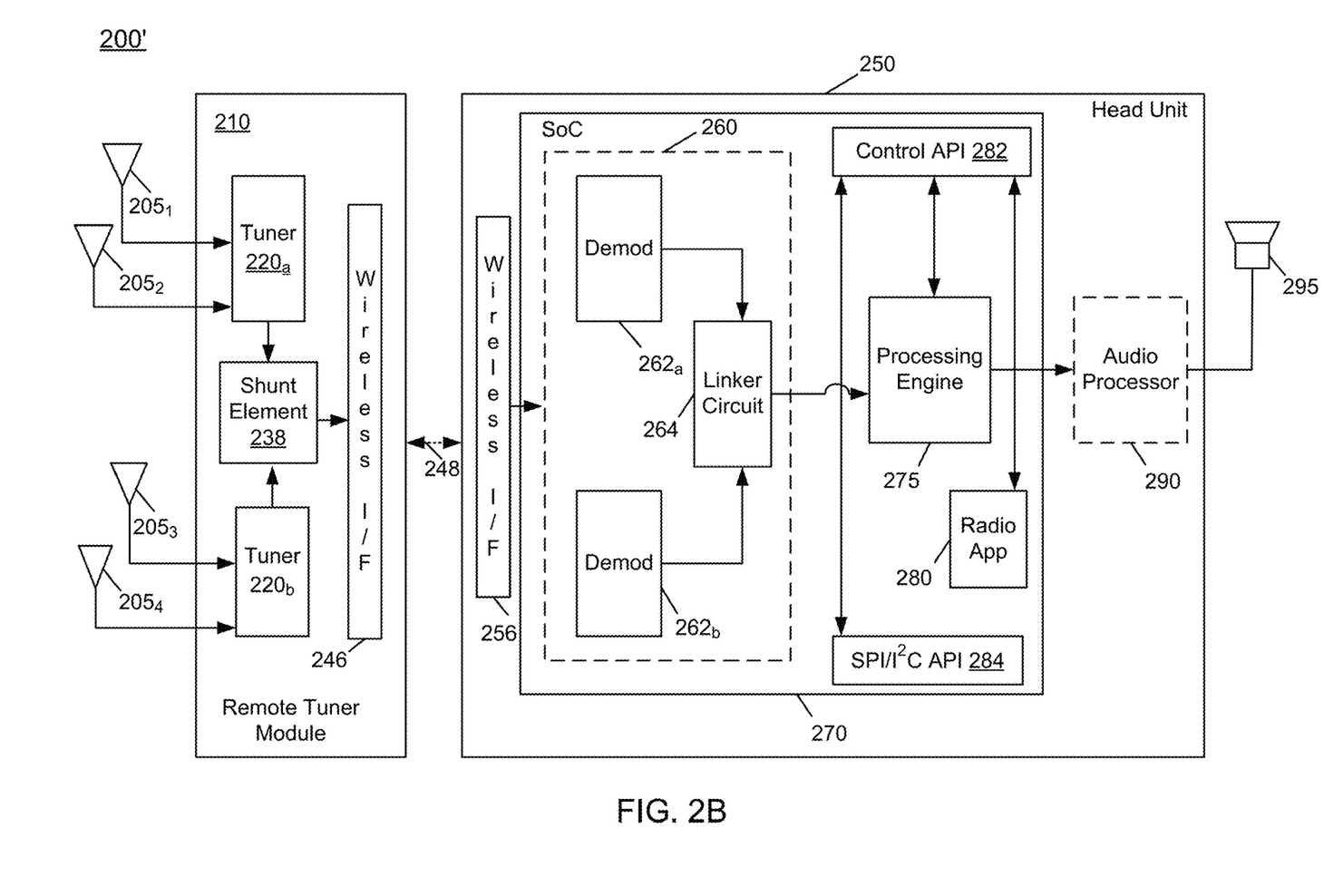
FIG. 2B is a block diagram of a system in accordance with another embodiment.

As discussed above, it is possible for wireless communication to occur between an RTM and the head unit. Referring now to FIG. 2B, shown is a block diagram of a system in accordance with another embodiment. As shown in FIG. 2B, system 200' may be adapted substantially the same as system 200 of FIG. 2A. However, in this embodiment, the gateway circuit is implemented using a wireless interface 246 in RTM 210 and a corresponding wireless interface 256 in head unit 250, such that wireless communication may occur between RTM 210 and head unit 250 via a wireless link 248. In other aspects, system 200' may be implemented similarly to system 200 of FIG. 2A. Further, while not shown in FIG. 2B, understand that it is also possible to provide gateway circuits that provide for both wired and wireless communication, such that depending upon operating conditions within a given vehicle, a selected one of a wired or wireless path may be used to provide communication between one or more RTMs and a head unit.

Figure 3:
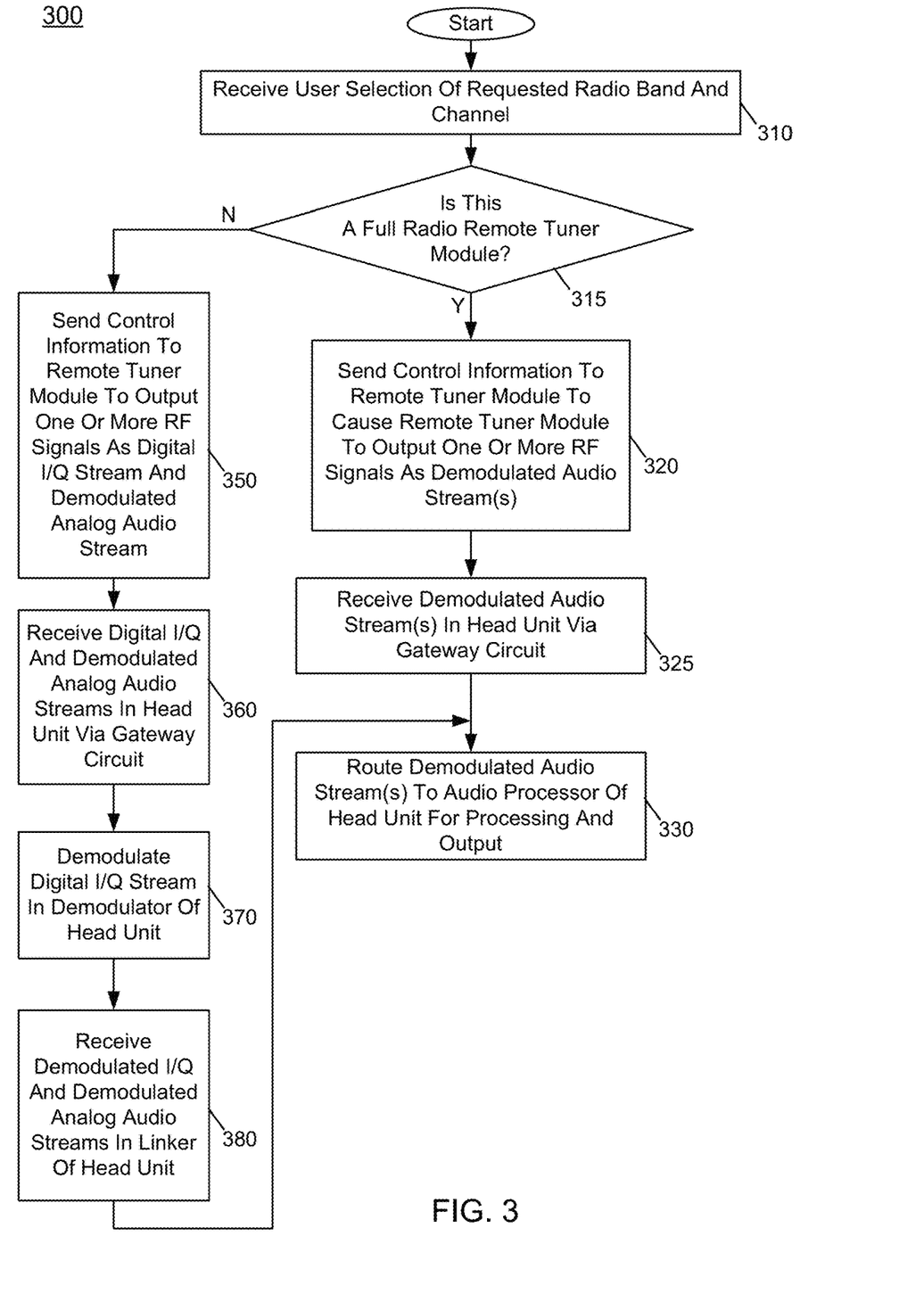
FIG. 3 is a flow diagram of a method in accordance with an embodiment.

Referring now to FIG. 3, shown is a flow diagram of a method in accordance with an embodiment. More specifically, method 300 is a method for operating an entertainment system to provide radio functionality as described herein. As such, method 300 may be performed by hardware circuitry, firmware, software and/or combinations thereof. In a particular embodiment, method 300 may be performed within an SoC or other general-purpose processor of a vehicle head unit that executes a radio software stack. As illustrated, method 300 begins by receiving a user selection of a requested radio band and channel (block 310). Next, control passes to diamond 315 where it may be determined whether a remote tuner module is to be configured for an audio-only output. Such determination may be based on whether the RTM is configured as a full radio RTM, and/or based on band and channel information.

In the instance of an audio-only output, control passes from 315 to block 320. At block 320, control information is sent to the remote tuner module. More specifically, this control information may be used to cause the remote tuner module to output one or more RF signals as demodulated audio streams. Such control information may include information to appropriately configure the RTM, as well as to provide control information for tuning to one or more desired channels. For example, such information may include one or more frequencies for a radio station of interest, such as a primary frequency channel and an alternate frequency channel, demodulation parameters and so forth. Understand that the control information may further include additional information such as commands for performing background scanning for other channels and so forth.

As such, the one or more individual tuners and demodulators in a remote tuner module may be configured to receive, downconvert and demodulate incoming RF signals into resulting audio signals. With this mode of operation, the remote tuner module output includes one or more demodulated audio streams.

Still referring to FIG. 3, control next passes to block 325 where the head unit may receive these one or more audio streams via a gateway circuit. As described herein, depending upon implementation, this gateway circuit may be a deserializer circuit or a wireless interface. When demodulated audio signals are received, and are not to be further processed, such as by way of linking with a digital stream, control passes to block 330 where the demodulated audio stream may be routed to an audio processor of the head unit for further processing and output, such as balance control, fading, mixing, filtering, equalization, etc.

Still referring to FIG. 3, instead if it is determined that both audio and modulated data are to be sent from the remote tuner module to the head unit, control passes from diamond 310 to block 350. At block 350, the SoC may send control information to the remote tuner module to cause it to output one or more RF signals that have been processed into a digital I/Q stream and a demodulated analog audio stream.

Next at block 360, the demodulated analog audio and digital I/Q information is received in the head unit via the gateway circuit. Control next passes to block 370 where the digital I/Q stream may be demodulated in a demodulator of the head unit. And as described herein in some embodiments, generic processing circuitry, e.g., of the SoC, may execute demodulator code to perform the demodulation. In other cases, the head unit may include an independent hardware demodulator circuit.

Still with reference to FIG. 3, control next passes to block 380 where the demodulated I/Q stream and the demodulated analog audio stream are both routed to a linker circuit of the head unit, where these signals may be linked together, in certain modes of operation. Thereafter, control passes to block 330, discussed above. Understand while shown at this high level in the embodiment of FIG. 3, many variations and alternatives are possible.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A remote radio tuner comprising:
    a first tuner configured to receive and process a first radio frequency signal to output a first downconverted modulated signal;
    a second tuner configured to receive and process a second radio frequency signal to output a second downconverted modulated signal;
    a demodulator circuit configured to demodulate the first downconverted modulated signal to a first demodulated signal, to demodulate the second downconverted modulated signal to a second demodulated signal, the demodulator circuit including a linker circuit configured to link the first demodulated signal and the second demodulated signal and to provide on an output of the demodulator circuit a demodulated output signal, the linker circuit configured to transition between providing the demodulated output signal based on the first demodulated signal and providing the demodulated output signal based on the second demodulated signal; and
    a gateway circuit coupled to the output of the demodulator circuit and configured to provide an output signal to a radio head unit via a link.

2. The remote radio tuner of claim 1 wherein the demodulator circuit is configured to link the first demodulated signal and the second demodulated signal to generate the demodulated output signal.

3. The remote radio tuner of claim 1 wherein, in an operational mode, the demodulated output signal includes information from both the first demodulated signal and the second demodulated signal.

4. The remote radio tuner of claim 1 wherein, in a bypass mode, the gateway circuit outputs the first downconverted modulated signal and the second downconverted modulated signal to the radio head unit.

5. The remote radio tuner of claim 1 further comprising a circuit board including a shunt element, the first tuner and the second tuner residing on the circuit board, the circuit board adapted for either i) a first configuration in which the demodulator circuit is included on the circuit board, or ii) a second configuration in which the demodulator circuit is not included on the circuit board and in which the shunt element directs the first downconverted modulated signal and the second downconverted modulated signal to the gateway circuit.

6. A system comprising the remote radio tuner of claim 1 and a second remote radio tuner including a third tuner and a fourth tuner, wherein the second remote radio tuner is coupled to the remote radio tuner.

7. The remote radio tuner of claim 1 wherein the link includes a wireless link, and the gateway circuit includes a wireless interface circuit.

8. The remote radio tuner of claim 1 wherein the first radio frequency signal and the second radio frequency signal include the same audio content at different frequencies.

9. The remote radio tuner of claim 1 wherein the first tuner is further configured to receive and demodulate a third radio frequency signal to output an analog audio signal, the gateway circuit further configured to output the analog audio signal to the radio head unit via the link.

10. A vehicle radio system comprising:
a remote tuner module configured to receive and process a first radio frequency signal to output a first downconverted modulated signal, to receive and process a second radio frequency signal to output a second downconverted modulated signal, the first radio frequency signal received at a first antenna and the second radio frequency signal received at a second antenna, the remote tuner module further configured to demodulate the first downconverted modulated signal to a first demodulated signal, to demodulate the second downconverted modulated signal to a second demodulated signal, and to link the first demodulated signal and the second demodulated signal such that the remote tuner module can transition between providing an output signal based on the first demodulated signal and providing an output signal based on the second demodulated signal; and
a radio head unit coupled to the remote tuner module via a wireless link, the radio head unit configured to receive and process the output signal received from the remote tuner module.

11. The vehicle radio system of claim 10 wherein the remote tuner module is further configured to link the first demodulated signal and the second demodulated signal to generate a linked demodulated signal, and to provide the linked demodulated signal as the output signal.

12. The vehicle radio system of claim 10 wherein, in an operational mode, the output signal includes information from both the first demodulated signal and the second demodulated signal.

13. The vehicle radio system of claim 10 wherein, in a bypass mode, the output signal includes first downconverted modulated signal and the second downconverted modulated signal.

14. The vehicle radio system of claim 10 wherein the first radio frequency signal and the second radio frequency signal include the same audio content at different frequencies.

15. The vehicle radio system of claim 10 wherein the remote tuner module is further configured to receive and demodulate a third radio frequency signal to output an analog audio signal.

16. A remote radio tuner comprising:
a first tuner configured to receive, process and demodulate a first radio frequency signal to output an audio signal;
a second tuner configured to receive and process a second radio frequency signal to output a first downconverted modulated signal;
a gateway circuit coupled to the first tuner and the second tuner and configured to output the audio signal and the first downconverted modulated signal to a radio head unit via a link; and
a circuit board including a shunt element, the first tuner and the second tuner residing on the circuit board, the shunt element configured to direct the first downconverted modulated signal to the gateway circuit without any demodulation, the remote radio tuner not including a demodulator.

17. The remote radio tuner of claim 16 wherein the first tuner is further to receive and process a third radio frequency signal to output a second downconverted modulated signal, and the gateway circuit further configured to output the second downconverted modulated signal to the radio head unit via the link.

18. The remote radio tuner of claim 17 wherein the second radio frequency signal and the third radio frequency signal include the same audio content at different frequencies.

19. The remote radio tuner of claim 16 wherein the link includes a wireless link.

* * * * *